May 28, 1957 J. N. VAN SCOYOC 2,794,165

MAGNETIC AMPLIFIER

Filed Aug. 8, 1952

Inventor
James N. Van Scoyoc by Hill, Sherman, Meroni, Gross & Simpson Attys

United States Patent Office 2,794,165
Patented May 28, 1957

2,794,165

MAGNETIC AMPLIFIER

James N. Van Scoyoc, Oak Park, Ill., assignor to Armour Research Foundation of Illinois Institute of Technology, Chicago, Ill., a corporation of Illinois Application August 8, 1952, Serial No. 303,310

11 Claims. (Cl. 323—89)

This invention relates to improvements in magnetic amplifiers.

Heretofore, magnetic amplifiers have had as a limiting factor in their operation the characteristics of the rectifier utilized therein. The finite back resistance of the rectifiers may constitute a limitation on the sensitivity and gain of the amplifier while the resistance of the rectifier in the conducting direction will constitute a power loss in the amplifier. Back voltage limitations of the rectifiers may also be a disadvantage.

It is therefore an object of the present invention to provide a novel magnetic amplifier utilizing a rectifying means having an extremely high back resistance and a very low forward resistance, and capable of withstanding relatively high back voltages.

It is a further object of the present invention to provide a novel magnetic amplifier utilizing such desirable rectifying means which is capable of operating from a unidirectional electrical power source.

It is another object of the present invention to provide a novel magnetic amplifier wherein a synchronous vibrator is utilized to produce alternating power from a unidirectional source and wherein contacts of said vibrator act as rectifiers in the magnetic amplifier circuit.

It is still another object of the present invention to provide a novel magnetic amplifier circuit including a synchronous vibrator for supplying an alternating voltage, the vibrator having contacts controlling the supply of a portion of said voltage to a load through a saturable reactor during one portion of a cycle, and the entire voltage being applied to the saturable reactor under the control of the amplifier input during another portion of a cycle.

It is yet another object of the present invention to provide such an amplifier circuit wherein further contacts of the vibrator control the supply of the entire voltage to the saturable reactor under the control of the amplifier input.

The novel features which I believe to be characteristic of my invention are set forth with particularity in the appended claims. My invention itself, however, both as to its organization, manner of construction and method of operation, together with further objects and advantages thereof, may best be understood by reference to the following description, taken in conjunction with the accompanying drawings, in which:

Figures 1, 2, 3, 4, 5, 6:
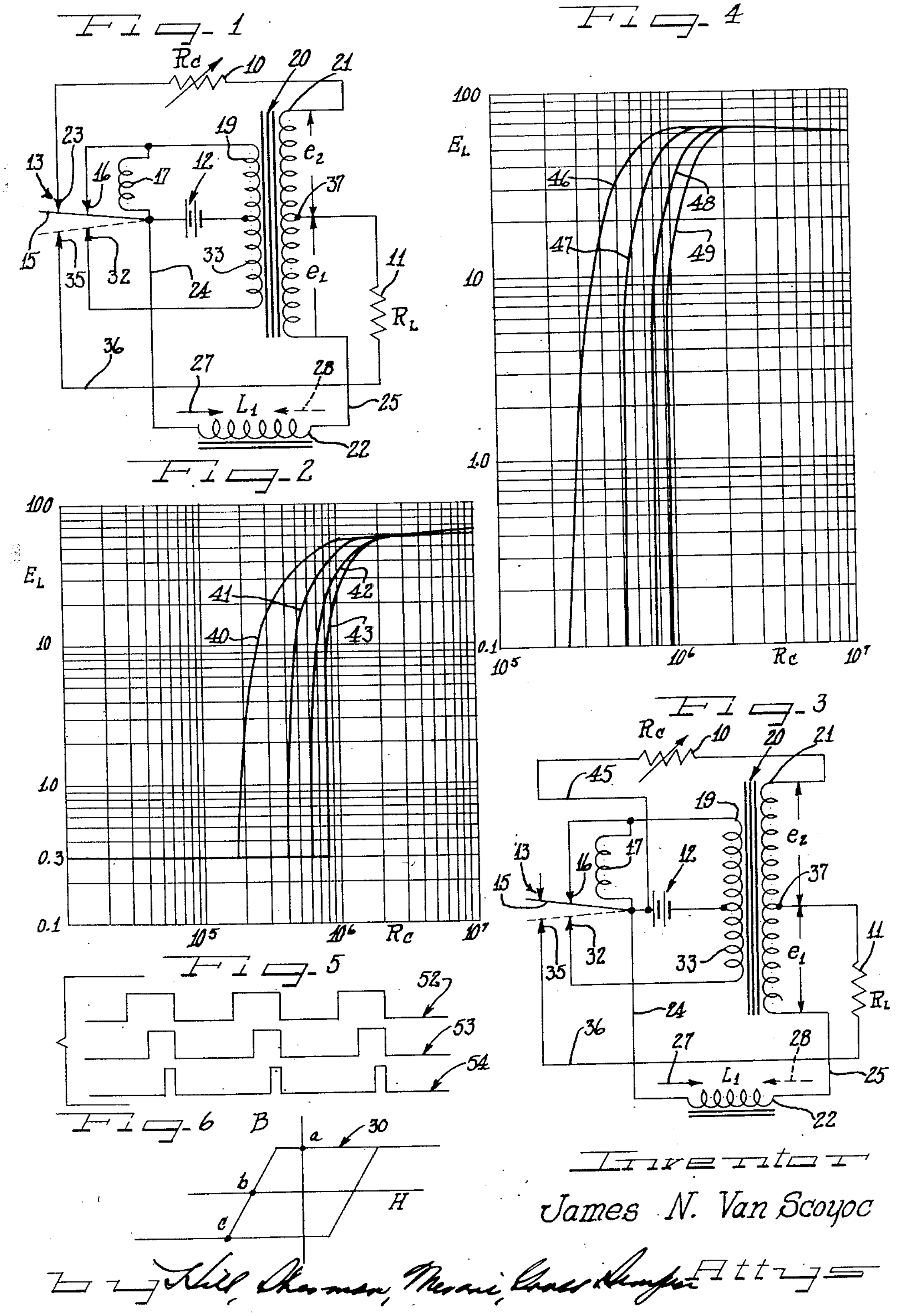
Figure 1 is a diagrammatic showing of one form of electrical circuit constituting a magnetic amplifier and embodying the teachings and principles of the present invention.
Figure 2 illustrates a series of operating curves obtained from a magnetic amplifier of the type shown in Figure 1.
Figure 3 is a diagrammatic illustration of a second form of electrical circuit constituting a magnetic amplifier and embodying the teachings and principles of the present invention.
Figure 4 illustrates a series of operating curves obtained from a magnetic amplifier of the type shown in Figure 3.
Figure 5 illustrates the waveform of the output voltage for three different operating conditions of the amplifier.
Figure 6 is a diagrammatic illustration of the magnetic characteristics of the saturable reactor utilized in the circuits of Figures 1 and 3.

In the embodiment of the invention illustrated in Figure 1, the input to the magnetic amplifier is shown as a variable resistance $R_c$ designated by the reference numeral 10. Such a resistance may, for example, represent the resistance of a lead sulfide photoconductive cell, which resistance varies in accordance with the amount of light impinging on the cell. The input to the amplifier may also be a voltage whose variations it is desired to amplify. The output of the amplifier may be utilized to actuate a relay or other load, here represented as a resistance $R_L$, having the reference numeral 11 applied thereto.

A unidirectional power source is utilized to supply power to the amplifier. In the present description, the term "unidirectional" is used in contradistinction to alternating, to indicate that the polarity of the source does not change. In the illustrated embodiment, the source is indicated as a battery 12 by way of example. A synchronous vibrator, indicated generally at 13, is utilized to translate the unidirectional power into alternating power and to provide the rectifying action in the amplifier.

When the vibrator blade 15 is in the position indicated in solid outline in Figure 1, continuity is established between the blade and contact 16 to short the actuating coil 17 and to send a pulse through the winding portion 19 of the primary of transformer 20. This pulse in turn induces a voltage $e_1+e_2$ in the secondary winding 21 which is applied to the control resistance $R_c$ and the saturable reactor 22 in series, the circuit extending from the upper end of winding 21 through resistor $R_c$, contact 23, blade 15, conductor 24, saturable reactor 22, and conductor 25 to the lower end of winding 21.

The value of the resistance of $R_c$ determines the degree of magnetization of the reactor $L_1$ in the back direction indicated by the solid arrow 27, which in turn controls the reactance of $L_1$ in the forward direction indicated by the dotted arrow 28 during the next portion of the cycle of the vibrator to be hereinafter described.

The reason for this will be readily understood by reference to Figure 6, showing the magnetic characteristics of the reactor $L_1$. If the reactor $L_1$ is assumed to be in a magnetic condition represented by the point *a* on the curve 30, which corresponds to a saturated condition of the core of the reactor in the forward direction, a magnetomotive force applied in the back direction may place the core in a condition corresponding to point *b* on the curve 30. Thus a subsequent forward magnetomotive force would encounter increased inductance by virtue of the previous back magnetomotive force, the amount of increase depending on the previous back M. M. F. which in turn depends on the value of $R_c$.

When the vibrator blade 15 is moved to its dotted position in Figure 1, as by means of a spring (not shown), the short circuit is removed from the actuator coil 17 of the vibrator in preparation for the energization of the coil 17 to return the blade 15 to its solid position. Also, the blade establishes continuity with contact 32 to send a pulse through portion 33 of the primary of transformer 20, inducing a voltage in secondary winding 21 of opposite polarity from that during the first portion of the vibrator cycle.

A portion of this voltage, $e_1$, is applied across the load $R_L$ and reactor $L_1$ through the following circuit: lower end of winding 21, conductor 25, reactor 22, conductor 24, blade 15, contact 35, conductor 36, load resistor 11, to tap 37 of the secondary winding 21. As previously described, the value of reactance $L_1$ in the forward direction is determined by the value of $R_c$ in the previous portion of the cycle, and thus the voltage across the load in the forward portion of the cycle will be a function of the value of $R_c$ during the previous back portion of the cycle.

By proper selection of the circuit parameters, small variations in $R_c$ can be made to produce very considerable changes in the output voltage $E_L$ appearing across the load $R_L$. As indicated in Figure 2, curve 40, for values of $e_1$ and $e_2$ of 120 volts and 60 volts respectively, a variation of $R_c$ from 150,000 ohms to 300,000 ohms will cause a variation in output voltage of from 0.3 volt to 15 volts. Curves 41, 42 and 43 indicate even greater changes where the values of $e_1$ and $e_2$ are, respectively, 120 volts and 120 volts; 120 volts and 180 volts; and 120 volts and 240 volts.

The embodiment of Figure 3 is similar to the embodiment of Figure 1 and corresponding parts have been given the same reference numerals. The difference between the circuits lies in the use of a direct connection 45 between the left terminal of resistor $R_c$ and the positive terminal of the battery 12. The effect of this change is indicated in Figure 4, where the values of $e_1$ and $e_2$ for curves 46, 47, 48 and 49 are the same, respectively, as for curves 40, 41, 42 and 43 of Figure 2. The value of $R_L$ for both Figures 2 and 4 is 3000 ohms. The differences in characteristics are due to the fact that $e_2$ contributes to the forward M. M. F. applied to the reactor during the forward portion of the cycle and opposes $e_1$ in supplying current to $R_L$. Otherwise, the circuits of Figures 1 and 3 operate similarly, and the operation of the circuit of Figure 3 need not be specifically described.

As indicated in Figure 5, since the output of the vibrator may be generally a square wave, the voltage appearing across $R_L$ will be generally a square wave also. The effect of decreasing $R_c$ is to decrease the saturation of $L_1$ and thus to delay the build up of voltage across $R_L$. The reactor $L_1$ thus acts like a time delay, but tends to permit the voltage across $R_L$ to maintain a generally square waveform. For a very high $R_c$ and therefore an initially substantially saturated condition of $L_1$ corresponding to point *a* on curve 30 in Figure 6, the voltage across $R_L$ builds up quickly as indicated at 52 and corresponds in duration to the input voltage, $e_1$. For lesser values of $R_c$, the voltage across $R_L$ builds up only after a time delay, curve 53 corresponding to an initial condition of $L_1$ such as point *b* on curve 30, and curve 54 corresponding to an initial condition of $L_1$ such as point *c* on curve 30. The linearity of response obtainable is indicated by the fact that each of curves 52, 53 and 54 is flat and of constant amplitude. Such a condition could not be obtained, for example, with a sinusoidal input voltage. The linearity of response obtainable is verified by the linearity of portions of the curves of Figures 2 and 4.

From the above description it will be apparent that my invention, in its broadest aspect, contemplates the driving of any magnetic amplifier by means of a synchronous vibrator, with auxiliary contacts of the vibrator being utilized as rectifiers in the amplifier circuit. The auxiliary vibrator contacts provide a very low resistance in one position and a very high resistance in the other position while being capable of withstanding substantial back voltages, thus serving as relatively ideal rectifiers.

It will be understood that modifications and variations may be effected throughout a wide range without departing from the scope of the novel concepts of the present invention.

I claim as my invention:

1. In combination in a magnetic amplifier, a vibrator for supplying an alternating voltage, and magnetic amplifier load and control circuits connected with said vibrator and including a saturable reactor, said vibrator controlling application of a portion of said voltage to said load circuit through said saturable reactor during one portion of each cycle of said alternating voltage, and said magnetic amplifier control circuit including means for applying said alternating voltage during a portion of each cycle of opposite polarity from said one portion of each cycle to said saturable reactor under the control of an input to said magnetic amplifier control circuit.

2. In combination in a magnetic amplifier, a vibrator for supplying an alternating voltage, and magnetic amplifier load and control circuits connected with said vibrator and including a saturable reactor, said vibrator controlling application of a portion of said voltage to said load circuit through said saturable reactor during one portion of each cycle of said alternating voltage, and said vibrator controlling application of said alternating voltage during a portion of each cycle of opposite polarity from said one portion of each cycle to said control circuit including said saturable reactor under the control of an input to said magnetic amplifier control circuit.

3. In combination in a magnetic amplifier, magnetic amplifier load and control circuits including a saturable reactor, a vibrator for converting a direct voltage into an alternating voltage for said circuit, an input element for controlling said control circuit, said control circuit having means for connecting said input element in circuit with said saturable reactor and said alternating voltage for energization of said reactor under the control of said input element in one half of each cycle of said vibrator, and a load element for energization from said load circuit, said vibrator having contacts for connecting said load element in circuit with said reactor and at least a portion of said alternating voltage in the other half of each cycle of said vibrator for delivering power to said load dependent on the degree of energization of said reactor in the previous half cycle.

4. In combination in a magnetic amplifier for connection between an input element and a load, a vibrator having a plurality of alternately closing pairs of contacts, a transformer having primary winding portions for alternate energization by a unidirectional source under the control of one group of said alternately closing pairs of contacts, and a saturable reactor connected with one side of another group of said alternately closing pairs of contacts for alternate connection in series with the secondary winding of said transformer and an input element, and in series with at least a portion of said secondary winding and a load.

5. In combination in a magnetic amplifier for connection between an input element and a load, a vibrator, a transformer having primary winding portions for alternate energization from a unidirectional source under the control of said vibrator, a saturable reactor connected in series with the secondary of said transformer, and means for connecting said secondary in series with an input element for energization of said saturable reactor during energization of one of said primary winding portions under the control of the input element, said vibrator having contacts closing during energization of the other of said primary windings to connect at least a portion of said secondary in series with a load for energizing said load under the control of said saturable reactor.

6. In combination in a magnetic amplifier, a transformer having a primary winding with a tap intermediate the ends thereof and a secondary winding with a tap intermediate the ends thereof, a vibrator having a contactor blade for connection in series with a unidirectional voltage and the tap of said primary winding, opposite contacts of said vibrator for alternate connection with said blade connected to opposite ends of said primary winding, means for connecting an input element to one end of said secondary, a saturable reactor connected to the other end of said secondary and with said contactor blade, a contact of said vibrator for cyclical connection with said blade, and means for connecting a load in series with said last mentioned contact and with said tap of said secondary winding.

7. In combination in a magnetic amplifier, a transformer having a primary winding with a tap intermediate the ends thereof and a secondary winding with a tap intermediate the ends thereof, a vibrator having a contactor blade for connection in series with a unidirectional voltage and the tap of said primary winding, opposite contacts of said vibrator for alternate connection with said blade connected to opposite ends of said primary winding, further opposite contacts connected respectively to one end of said secondary winding and to said tap thereof, means for connecting respectively an input element and a load in series with the respective further opposite contacts, and a saturable reactor connected between the other end of said secondary winding and said blade.

8. In combination in a magnetic amplifier, electrically energizable magnetically saturable means, means comprising an electric control circuit for conditioning said saturable means in accordance with a given control variable, means comprising an electric output circuit controlled by said saturable means for delivering power to a load in accordance with said control variable, cyclically operating interrupter means in both said electric control circuit and said electric output circuit, and means comprising said cyclically operating interrupter means for applying electrical energy to said electric control circuit during one portion of the cycle of said cyclically operating interrupter means to condition said saturable means and for applying electrical energy to said electrical output circuit under the control of said saturable means during another portion of the cycle of said cyclically operating interrupter means.

9. In combination, electrically energizable magnetically saturable means, means comprising an electric control circuit for conditioning said saturable means in accordance with a given control variable, means comprising an electric output circuit controlled by said saturable means for delivering power to a load in accordance with said control variable, cyclically operating interrupter means having a first set of contacts connected in said electric control circuit and having a second set of contacts connected in said electric output circuit, said first and second sets of contacts closing at different instants of time in each cycle of said interrupter means to initiate current flow first in said control circuit and then in said output circuit.

10. In combination, electrically energizable magnetically saturable means, means comprising an electric control circuit for conditioning said saturable means in accordance with a given control variable, means comprising an electric output circuit controlled by said saturable means for delivering power to a load in accordance with said control variable, alternating current supply means comprising a vibrator having contacts for supplying an alternating voltage from a unidirectional source, and said vibrator having a further set of contacts in said load circuit for rectifying current flow from said supply means to said load under the control of said saturable means.

11. In combination, electrically energizable magnetically saturable means, means comprising an electric control circuit for conditioning said saturable means in accordance with a given control variable, means comprising an electric output circuit controlled by said saturable means for delivering power to a load in accordance with said control variable, alternating current supply means comprising a vibrator having two sets of alternately closing contacts for supplying an alternating voltage from a unidirectional source, and said vibrator having a third set of contacts in said load circuit for rectifying current flow from said supply means to said load under the control of said saturable means.

References Cited in the file of this patent

UNITED STATES PATENTS

| | | |
|---|---|---|
| 2,598,617 | Stimler | May 27, 1952 |
| 2,673,321 | Stimler | Mar. 23, 1954 |

FOREIGN PATENTS

| | | |
|---|---|---|
| 233,014 | Switzerland | Oct. 2, 1944 |
| 233,962 | Switzerland | Dec. 1, 1944 |

OTHER REFERENCES

Magnetic Amplifier Circuits, Geiger, pp. 147, 148, McGraw-Hill, New York, 1954.